United States Patent
Freitag et al.

(10) Patent No.: US 7,070,697 B2
(45) Date of Patent: Jul. 4, 2006

(54) METHODS OF MAKING A READ SENSOR WITH USE OF A BARRIER STRUCTURE FOR DEPOSITING MATERIALS

(75) Inventors: James Mac Freitag, San Jose, CA (US); Kim Yang Lee, Fremont, CA (US); Mustafa Pinarbasi, Morgan Hill, CA (US); Chun-Ming Albert Wang, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 170 days.

(21) Appl. No.: 10/413,322

(22) Filed: Apr. 14, 2003

(65) Prior Publication Data

US 2004/0200800 A1   Oct. 14, 2004

(51) Int. Cl.
*B44C 1/22* (2006.01)
*G11B 5/127* (2006.01)

(52) U.S. Cl. .................... 216/22; 216/41; 427/132; 427/282; 29/603.18; 360/322

(58) Field of Classification Search ................ 216/22, 216/41; 427/132, 282, 523; 360/313–328; 29/603.18; 204/298.11
See application file for complete search history.

(56) References Cited

U.S. PATENT DOCUMENTS

| | | | |
|---|---|---|---|
| 3,576,670 A | 4/1971 | Hammond | |
| 4,705,359 A | 11/1987 | Amstutz et al. | |
| 5,024,896 A | 6/1991 | Mathad et al. | |
| 5,529,670 A * | 6/1996 | Ryan et al. ............ | 204/192.15 |
| 5,705,042 A | 1/1998 | Leiphart et al. | |
| 5,746,634 A | 5/1998 | Jankowski et al. | |
| 5,785,763 A | 7/1998 | Onda et al. | |

(Continued)

FOREIGN PATENT DOCUMENTS

JP     01-222045     5/1989

(Continued)

OTHER PUBLICATIONS

Michael Kautzky et al., "The Application of Collimated Sputtering to Abutted Junction Reader Processing", Datatech publication, Seagate Technology of Minneapolis, MN, U.S.A., pp. 112-117.

(Continued)

*Primary Examiner*—Shamim Ahmed
(74) *Attorney, Agent, or Firm*—John J. Oskorep, Esq.

(57) ABSTRACT

In one illustrative example, a method of making a read sensor of a magnetic head involves forming a barrier structure which surrounds a central mask formed over a plurality of read sensor layers; etching the read sensor layers to form the read sensor below the mask; and depositing, with use of the mask and the barrier structure, hard bias and lead layers to form around the read sensor. The barrier structure may be formed by, for example, depositing one or more barrier structure layers over the read sensor layers and performing a photolithography process. The barrier structure physically blocks materials being deposited at relatively low angles (e.g. angles at or below 71 degrees) so as to reduce their formation far underneath the mask (e.g. when using a bridged mask), which could otherwise form an electrical short, and/or to improve the symmetry of the deposited materials around the read sensor.

29 Claims, 9 Drawing Sheets

U.S. PATENT DOCUMENTS

| | | | |
|---|---|---|---|
| 5,885,425 | A | 3/1999 | Hsieh et al. |
| 6,162,495 | A | 12/2000 | Morton |
| 6,168,832 | B1 | 1/2001 | Boucher |
| 6,202,591 | B1 | 3/2001 | Witzman et al. |
| 6,209,193 | B1 * | 4/2001 | Hsiao .................. 29/603.15 |
| 2001/0005553 | A1 | 6/2001 | Witzman et al. |
| 2001/0011524 | A1 | 8/2001 | Witzman et al. |
| 2001/0021455 | A1 | 9/2001 | Witzman et al. |
| 2002/0101690 | A1 * | 8/2002 | Gill et al. .................. 360/320 |

FOREIGN PATENT DOCUMENTS

| | | |
|---|---|---|
| WO | WO 0008228 A1 | 2/2000 |

OTHER PUBLICATIONS

E. C. Fredericks et al., "Novel Linear Evaporator For VLSI Thin Films", IBM Technical Disclosure Bulletin (TDB), Jun. 1985, vol. 28, No. 1, pp. 184-186.

N. Carlier, "Use of Standard Size Evaporators For Small Angle Metal Deposition On Large Wafers", IBM Technical Disclosure Bulletin (TDB), Jan. 1991, vol. 33, No. 8, pp. 198-199.

J. P. Hoekstra, 'Apparatus To Obtain Optimum Control On Metal Vapor Deposition', IBM Technical Disclosure Bulletin (TDB), Mar. 1972, vol. 14, No. 10, pp. 3043-3044.

* cited by examiner

METHODS OF MAKING A READ SENSOR WITH USE OF A BARRIER STRUCTURE FOR DEPOSITING MATERIALS

BACKGROUND OF THE INVENTION

1. Field of the Invention

The present invention relates generally to methods of making a read sensor for a magnetic head, and more particularly to methods of making a read sensor with use of a barrier structure when depositing materials.

2. Description of the Related Art

Figure 1:
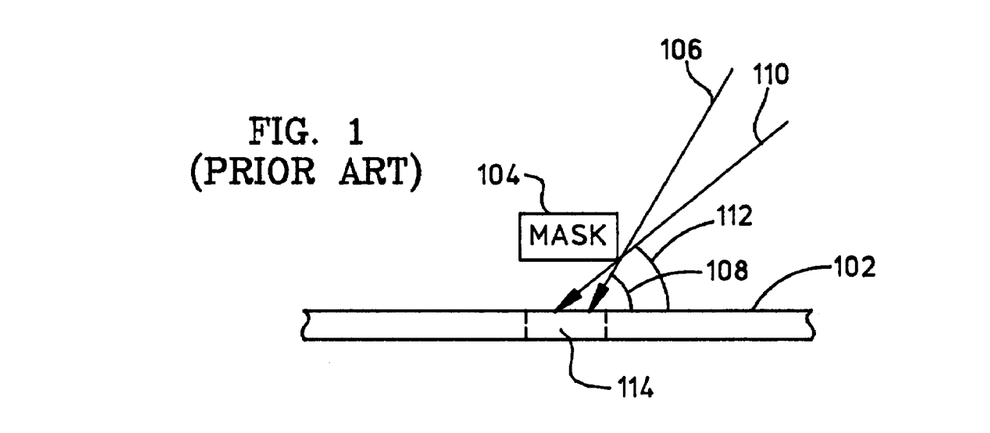
FIG. 1 is a cross-sectional illustration of a mask formed over a plurality of read sensor layers, where relatively low angles of deposition cause material to undesirably form underneath the mask.

FIG. 1 is a cross-sectional illustration showing one conventional step in a method of making a read sensor, such as a giant magnetoresistive (GMR) read sensor, of a magnetic head. More particularly, FIG. 1 shows a cross-section of mask 104 formed over a plurality of read sensor layers 102. Mask 104 is typically kept in place for use in etching read sensor materials 102 around mask 104 and subsequently depositing additional materials around a central read sensor 114 formed underneath mask 104. These deposited layers may be, for example, metal layers such as hard bias and lead layers. Mask 104 is typically a bilayer mask which includes a top layer of photoresist and a bottom underlayer of polymethylglutarimide (PMGI), for example. Methods of making read sensors with use of such masks include but are not limited to those described in U.S. Pat. No. 5,018,037. As an alternative, in the cross-section of FIG. 1 no bottom underlayer of mask 104 remains. Mask 104 of FIG. 1 is supported by surrounding materials (not visible in the particular cross-section shown) and may be referred to as a "bridged mask" or a "bridge". Such bridged masks 104 may be used to form read sensors with very narrow track widths, for example, track widths below 0.15 micrometers (μm).

When materials are sputter deposited, they are directed at various angles, for example, at different angles designated by arrows 106 and 110. Relatively low angles of deposition (e.g. the angle designed by arrow 110) cause some of the materials to form too far underneath mask 104. Such formation may cause the materials to make physical contact with deposited materials from the other side of read sensor 114. If the materials being deposited are metal materials, such as hard bias and lead layers, they may cause an electrical short over the top of read sensor 114. Also, material layers formed along each side of read sensor 114 undesirably tend to be asymmetrical with respect to one another. Furthermore, each material layer formed along each side of read sensor 114 tends to be imperfect and varies in distance from the center of read sensor 114 in directions in and out of the page.

Accordingly, what are needed are methods of making read sensors which eliminate or reduce the problems associated with conventional processes.

SUMMARY OF THE INVENTION

Methods of making a read sensor of a magnetic head with use of a surrounding barrier structure are described. In one illustrative example, the method involves forming a barrier structure which surrounds a mask; and depositing, with use of the barrier structure, metal layers to form around a read sensor formed below the mask. The deposited material layers may be, for example, metal layers such as hard bias and lead layers for the read sensor. The barrier structure may be formed by, for example, depositing one or more barrier structure layers and performing a photolithography process on the one or more barrier structure layers. The method may also include etching, with use of the mask, a plurality of read sensor layers to form the read sensor below the mask. Advantageously, the barrier structure physically blocks materials being deposited at relatively low angles so as to maintain better process control and to improve the formation and symmetry of deposited materials around the read sensor.

DETAILED DESCRIPTION OF THE PREFERRED EMBODIMENTS

Methods of making a read sensor of a magnetic head with use of a surrounding barrier structure are described. In one illustrative example, the method involves forming a barrier structure which surrounds a mask; and depositing, with use of the barrier structure, metal layers to form around a read sensor formed below the mask. The deposited material layers may be, for example, metal layers such as hard bias and lead layers for the read sensor. The barrier structure may be formed by, for example, depositing one or more barrier structure layers and performing a photolithography process on the one or more barrier structure layers. The method may also include etching, with use of the mask, a plurality of read sensor layers to form the read sensor below the mask. Advantageously, the barrier structure physically blocks materials being deposited at relatively low angles so as to maintain better process control and to improve the formation and symmetry of deposited materials around the read sensor.

Figure 2:
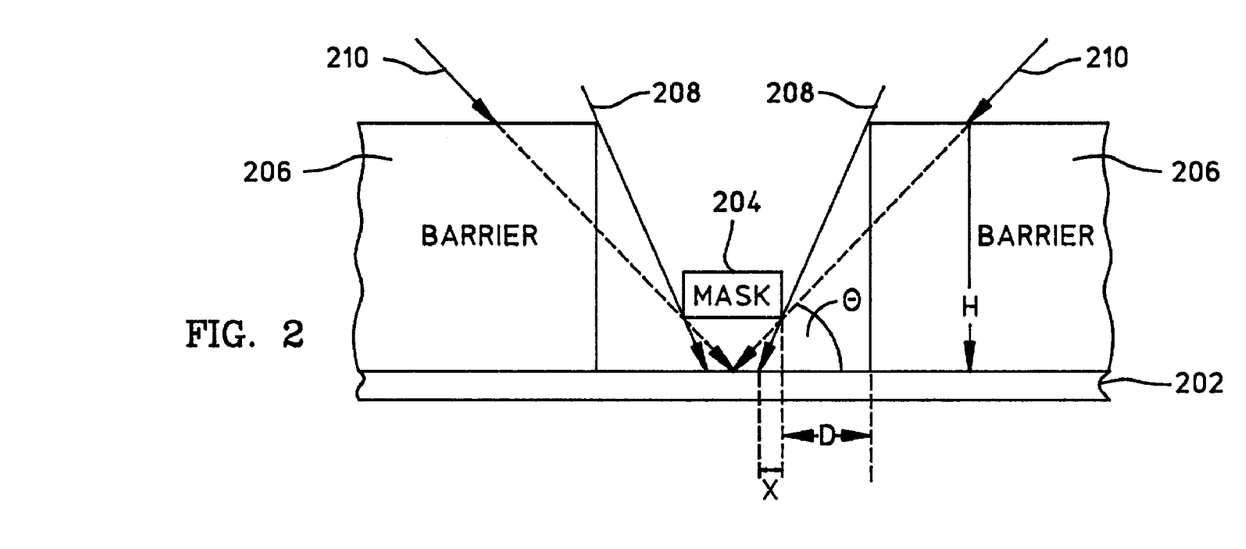
FIG. 2 is a cross-sectional illustration of a mask formed over a plurality of read sensor layers and a barrier structure which surrounds the mask, where relatively low angles of deposition are blocked by the barrier structure.

FIG. 2 is a cross-sectional illustration of a mask 204 formed over a plurality of read sensor layers 202 and a barrier structure 206 which surrounds mask 204. Broadly, relatively low angles of deposition of materials are blocked with use of barrier structure 206. Deposited materials will be less likely to form underneath mask 204 beyond a distance X, which depends on a distance D (the distance from the edge of mask 204 to the edge of barrier structure 206) and a height H (the height of barrier structure 206) as indicated. Preferably, barrier structure 206 is formed with appropriate dimensions (e.g. D and H) so that materials deposited at angles below θ degrees are physically blocked by barrier structure 206. As illustrated, material deposition indicated by arrows 208 is allowed to pass whereas material deposition indicated by arrows 210 is blocked by barrier structure 206. The deposition angles to be blocked will vary and depend upon the particular application and desired results.

Mask 204 is formed over and on top of read sensor layers 202. The top layer of read sensor layers 202 is typically a capping layer, which may be a layer of tantalum (Ta), for example. Mask 204 may be a bilayer mask which includes a top layer of photoresist and a bottom underlayer of polymethylglutarimide (PMGI). As an alternative, mask 204 may not have a bottom underlayer but rather be supported by surrounding materials (not visible in the particular cross-section shown) and may be referred to as a "bridged mask" or a "bridge". Such bridged masks 104 may be used to form read sensors with very narrow track widths, for example, track widths below 0.15 micrometers (μm).

Barrier structure 206 is formed over and on read sensor layers 202 and surrounds mask 204. Barrier structure 206 includes a top opening which exposes a top and top side edges of mask 204. As will be described in more detail, barrier structure 206 may be formed by depositing one or more barrier layers over read sensor layers 202 and then forming barrier structure 206 from the one or more barrier layers. For example, the one or more barrier layers may be a photoresist layer which is deposited or spun-on and subsequently formed into the barrier structure with use of a conventional photolithography process. Other suitable processes may be utilized as well.

Figure 3:
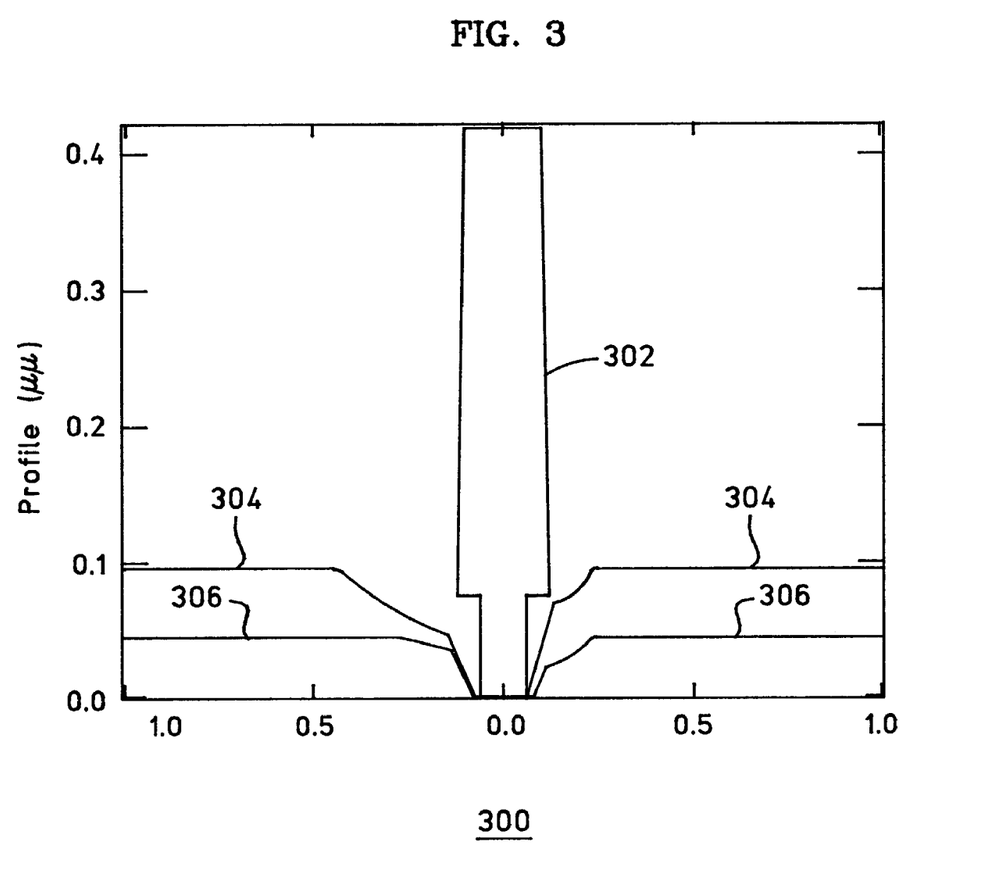
FIG. 3 is a graph from a simulation which shows deposition profiles with and without use of a barrier structure.

FIG. 3 is a graph 300 from a simulation which shows deposition profiles with and without use of a barrier structure such as that described in relation to FIG. 2. A profile of a central mask 302 is shown in FIG. 3. Without use of a barrier structure, top material deposition profile lines 304 reveal some formation of materials underneath mask 302 and an asymmetrical formation when comparing each side of mask 302. With use of a barrier structure, bottom material deposition profile lines 306 reveal little if any formation of materials underneath mask 302 and a relatively symmetrical formation. Now referring to FIG. 4, a graph 400 from a simulation which shows deposition profiles at a center and edge site of a wafer of a read sensor from use of a barrier structure such as that described in relation to FIG. 2 is shown. Top material deposition profile lines 404 at a center cross-section reveal little if any formation of materials underneath a mask 402 and relatively symmetrical formation, and bottom material deposition profile lines 406 at an edge cross-section reveal the same and a relatively identical profile as at its center.

Figure 4:
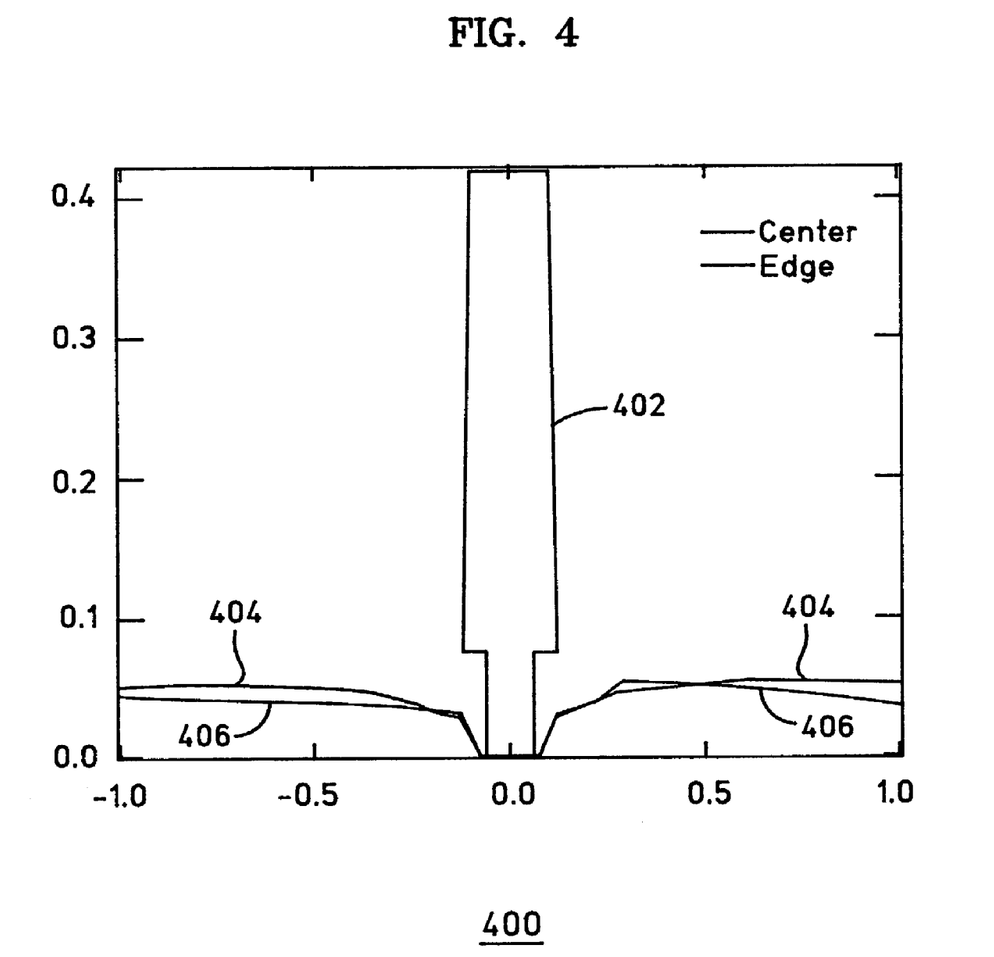
FIG. 4 is graph from a simulation which shows symmetrical deposition profiles at a center and edge site of a wafer of a read sensor from use of a barrier structure.
Figure 5:
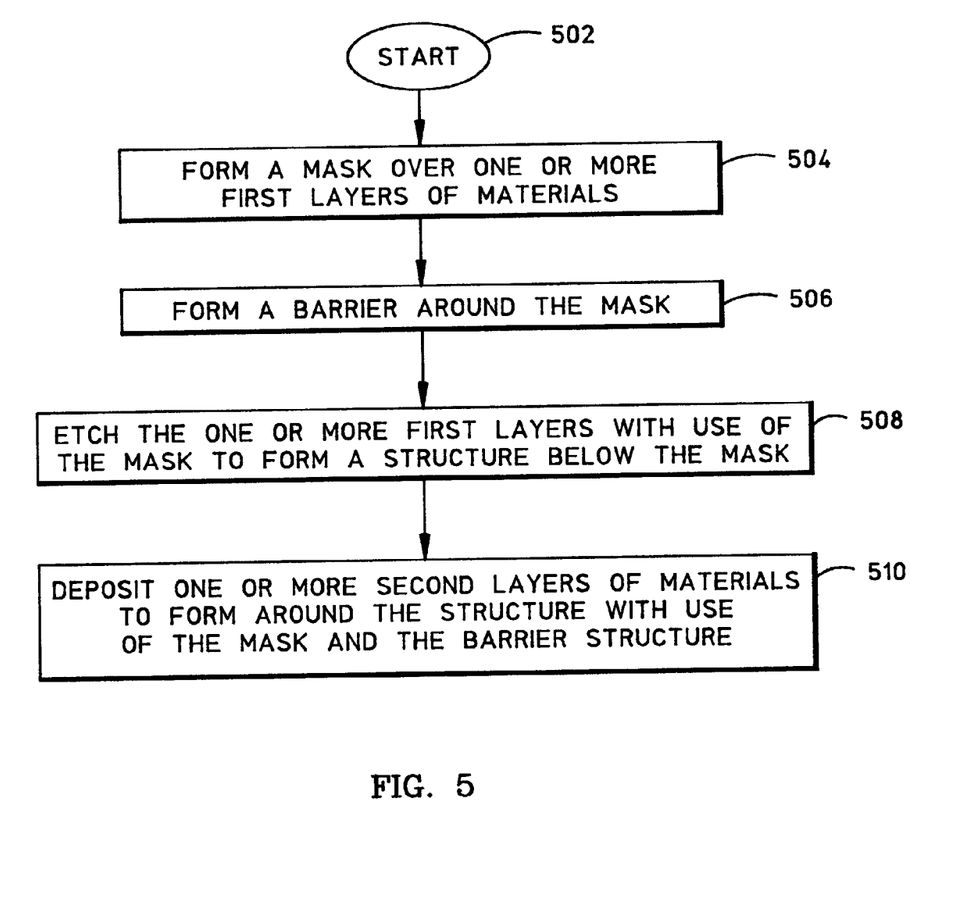
FIG. 5 is a flowchart which describes a general method of making a read sensor or semiconductor device with use of a barrier structure.

FIG. 5 is a flowchart which describes a general method of making a read sensor or other semiconductor device with use of a barrier structure such as that shown and described in relation to FIGS. 2–4. Beginning at a start block 502, a mask is formed over one or more first layers of materials (step 504). If this method is being used to make a read sensor, the one or more first layers of materials are read sensor layers and the mask may be or include a resist mask. A barrier structure is then formed so as to surround the mask (step 506). The barrier structure may be formed by depositing one or more barrier structure layers (e.g. photoresist) over the one or more first layers of materials and performing a conventional photolithography process, for example. Next, the one or more first layers are etched with use of the mask to form a structure below the mask (step 508). If this method is being used to make a read sensor, the resulting structure is the read sensor. With use of the mask and the barrier structure, the one or more second layers of materials are deposited so as to form around the structure below the mask (step 510). If this method is being used to make a read sensor, the one or more second layers of materials are metal layers such as hard bias and lead layers. By use of the surrounding barrier structure during this deposition, little if any formation of materials underneath the mask exists and a relatively symmetrical material formation from center to edge exists. Better control over deposition and a reduced likelihood of metal "shorting" is gained by use of this method.

Figure 6:
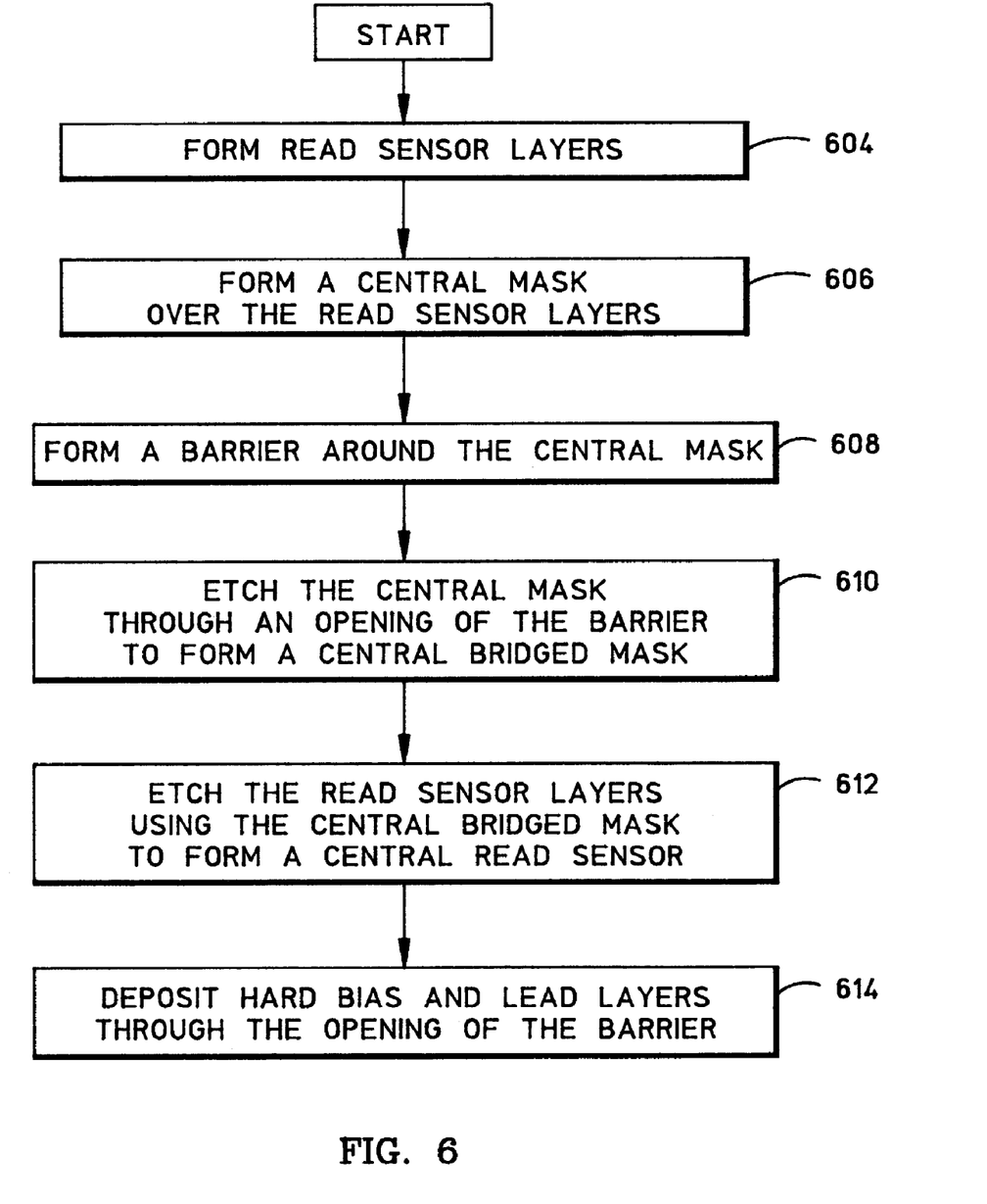
FIG. 6 is a flowchart which describes a more particular method of making a read sensor of a magnetic head with use of a barrier structure.
Figure 7:
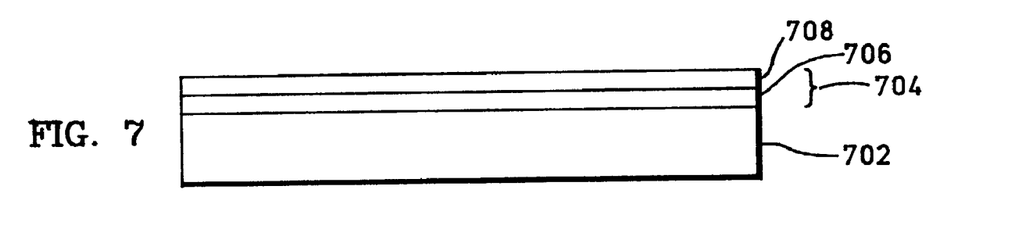
FIG. 7 is the first in a series of ten cross-sectional illustrations of FIGS. 7–16 in the method of making a read sensor described in relation to FIG. 6, which shows one or more first mask layers formed over a plurality of read sensor layers.

FIG. 6 is a flowchart which describes a more particular method of making a read sensor of a magnetic head with use of a barrier structure. The barrier structure formed may that the same as or similar to that described in relation to FIGS. 1–4. The flowchart description of FIG. 6 refers to the cross-sectional illustrations of FIGS. 7–16 in combination therewith. In FIG. 7, a plurality of read sensor layers 702 are formed as is conventional (step 602 of FIG. 6). The read sensors may be or include several different layers of materials of a giant magnetoresistive (GMR) read sensor, such as tantalum, nickel-iron, cobalt-iron, copper, platinum-manganese, ruthenium, as examples. The top layer of read sensor layers 702 is typically a capping layer which may be made of tantalum.

Figure 8:
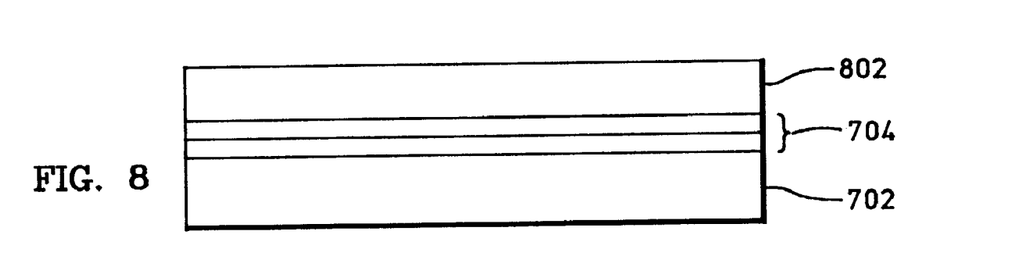
FIG. 8 is the second in the series of ten cross-sectional illustrations of FIGS. 7–16 in the method of making a read sensor described in relation to FIG. 6, which shows a second mask layer formed over the one or more first mask layers.

Next, a central mask is formed over these read sensor layers (step 604 of FIG. 6). To form the central mask in step 604, the following process may be used. One or more first mask layers 704 (see FIG. 7) are formed over read sensor layers 702. In the present embodiment, the one or more first mask layers 704 include a bottom underlayer 706 (e.g. Durimide or a commercial polymer-based BARC (Bottom Anti-Reflection Coating)) and a top layer 708 of spin-on glass (SOG) or resist. For example, bottom underlayer 706 may be formed with resist of about 50 nanometers (nm) and top layer 708 may be formed with SOG of about 250 nm. Other suitable materials may be utilized as well; top layer 708 may be a dielectric material such as silicon oxide or tantalum oxide. In FIG. 8, it is shown that one or more second mask layers 802 are deposited over these one or more first mask layers 704. The one or more second mask layers 802 may be or include a photoresist (such as a single layer of photoresist) or other suitable material. For example, one or more second mask layers 802 may be a single layer of imaging resist having a thickness of about 350 nm. From these one or more second mask layers 802, it is shown that a preliminary mask 902 is formed in FIG. 9. Preliminary mask 902 may be made by performing a conventional photolithography process to form etched regions 904 which surround preliminary mask 902 and expose top surfaces of one or more first mask layers 704. From the one or more first mask layers 704, a central mask 1002 is formed as shown in FIG. 10.

Figure 9:
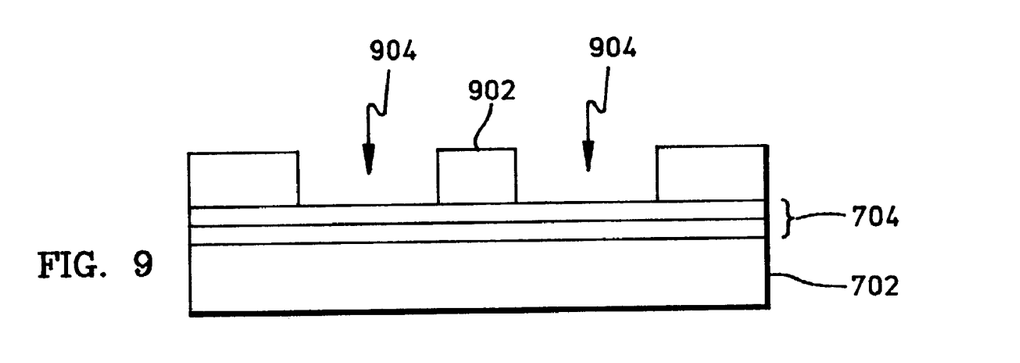
FIG. 9 is the third in the series often cross-sectional illustrations of FIGS. 7–16 in the method of making a read sensor described in relation to FIG. 6, which shows a first mask formed from the second mask layer.
Figure 10:
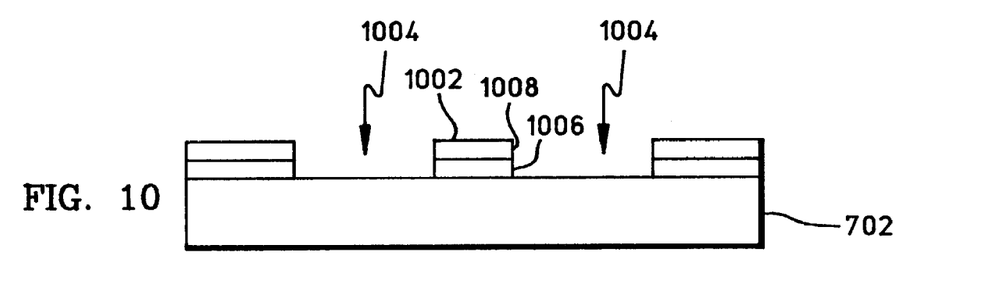
FIG. 10 is the fourth in the series of ten cross-sectional illustrations of FIGS. 7–16 in the method of making a read sensor described in relation to FIG. 6, which shows a second mask formed use of the first mask which is subsequently removed.

In the present embodiment, the one or more first mask layers 704 of FIG. 9 which are exposed by etched regions 904 are removed by reactive ion etching (RIE) to form central mask 1002 of FIG. 10. The RIE forms etched regions 1004 which surround central mask 1002 and expose top surface of read sensor layers 702. Any suitable etch gas, such as fluorocarbon, for example, may be utilized for the RIE. After the RIE, first preliminary mask 902 shown in FIG. 9 and remaining layers are removed by applying a conventional stripper solution, for example. The resulting central mask 1002 of FIG. 10, which includes a top layer 1008 and a bottom underlayer 1006, is thereby exposed.

Figure 11:
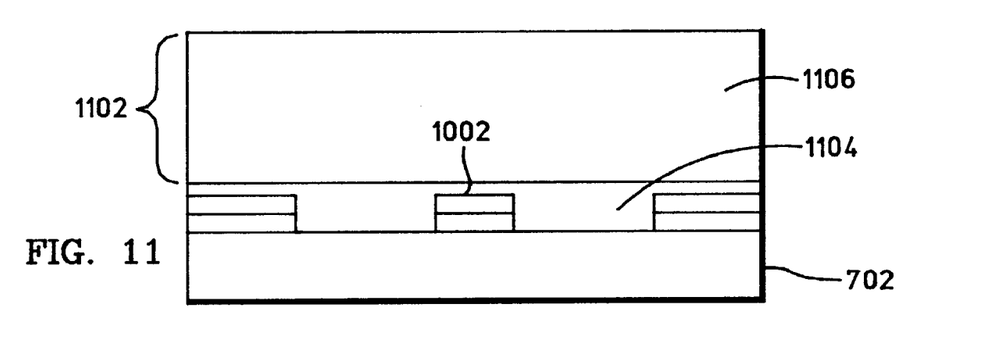
FIG. 11 is the fifth in the series often cross-sectional illustrations of FIGS. 7–16 in the method of making a read sensor described in relation to FIG. 6, which shows one or more third mask layers formed over the second mask and the read sensor layers.
Figure 12:
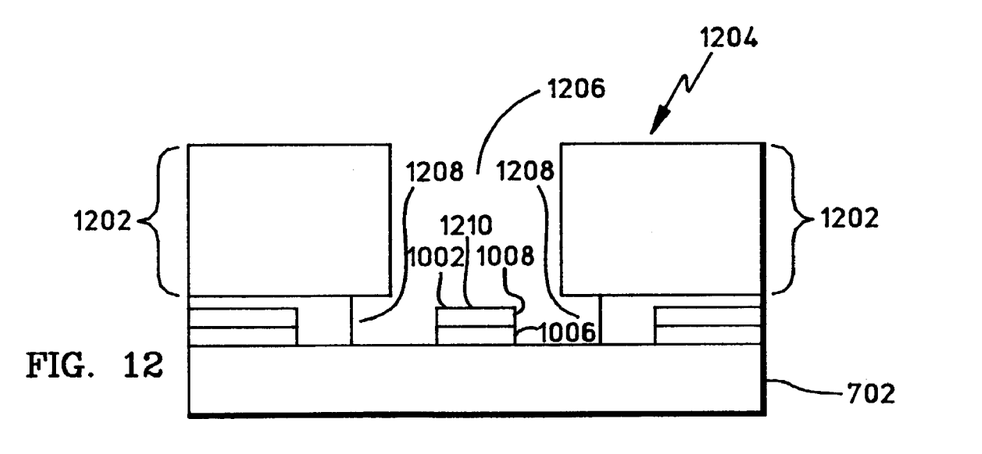
FIG. 12 is the sixth in the series of ten cross-sectional illustrations of FIGS. 7–16 in the method of making a read sensor described in relation to FIG. 6, which shows a barrier structure formed from the one or more third mask layers.

A barrier structure is then formed around this central mask (step 608 of FIG. 6). To form barrier structure in step 608, the following process may be used. In FIG. 11, one or more barrier material layers 1102 are deposited over the existing structure of FIG. 10 (e.g. over read sensor layers 702 and central mask 1002). The one or more barrier material layers 1102 may include a bottom underlayer 1104 of polymethylglutarimide (PMGI) (relatively thin as shown) and a top layer 1106 of resist. Bottom underlayer 1104 may be formed with any suitable thickness. For example, bottom underlayer 1104 may be 100 nm in one embodiment, and top layer may be an imaging resist of about 3 micrometers (μm). In FIG. 12, a slit or opening 1206 is formed through the one or more barrier material layers 1102 to expose a top 1210 and side edges of central mask 1002. This may be done, for example, using a conventional photolithography process (e.g. I-line or DUV photolithography). By performing this step, a barrier structure 1204 which surrounds central mask 1002 is formed (shown in cross-section as two barrier structure portions 1202). In FIG. 12 it is shown that, since two different barrier material layers are utilized, an undercut 1208 is formed in the bottom underlayer of barrier structure 1204 during development, which is well-known and due to the fact that the bottom underlayer is soluble in the developer.

Figure 13:
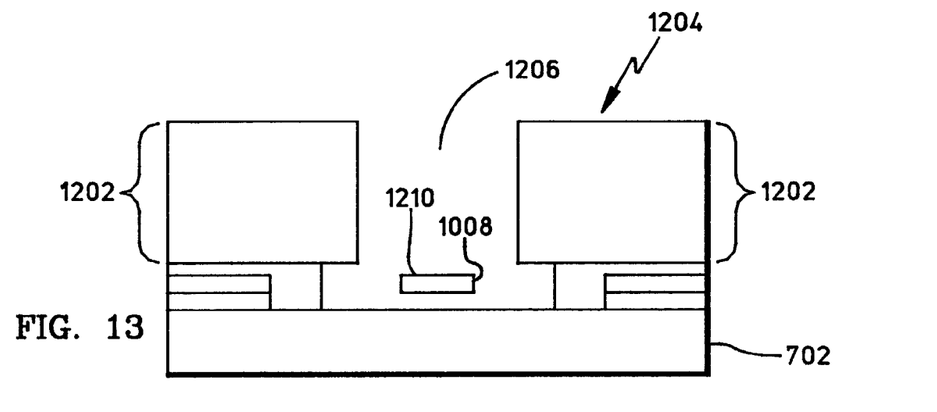
FIG. 13 is the seventh in the series of ten cross-sectional illustrations of FIGS. 7–16 in the method of making a read sensor described in relation to FIG. 6, which shows the second mask with an underlayer removed.
Figure 14:
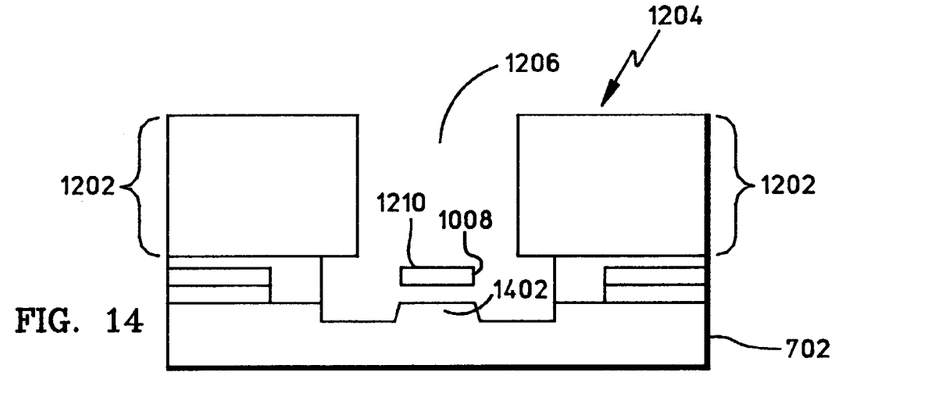
FIG. 14 is the eighth in the series of ten cross-sectional illustrations of FIGS. 7–16 in the method of making a read sensor described in relation to FIG. 6, which shows a central read sensor formed below the mask by removing end portions of the read sensor layers by ion milling.

In FIG. 13, it is shown that the underlayer of central mask 1210 is etched away through opening 1206 of barrier structure 1204 to form a central bridged mask 1210. This etch may be, for example, an isotropic oxygen etch. Only top layer 1008 remains and underlayer 1006 (FIG. 12) is removed completely in this cross-sectional view. In FIG. 14, it is shown that a central read sensor 1402 is then formed by etching (e.g. ion milling) with central bridged mask 1210 and barrier structure 1204 in place (step 612 of FIG. 6). Since a bridged mask 1210 is used, a very narrow track width for central read sensor 1402 can be defined. For example, central read sensor 1402 may have a track width between about 50 and 150 nm.

Figure 15:
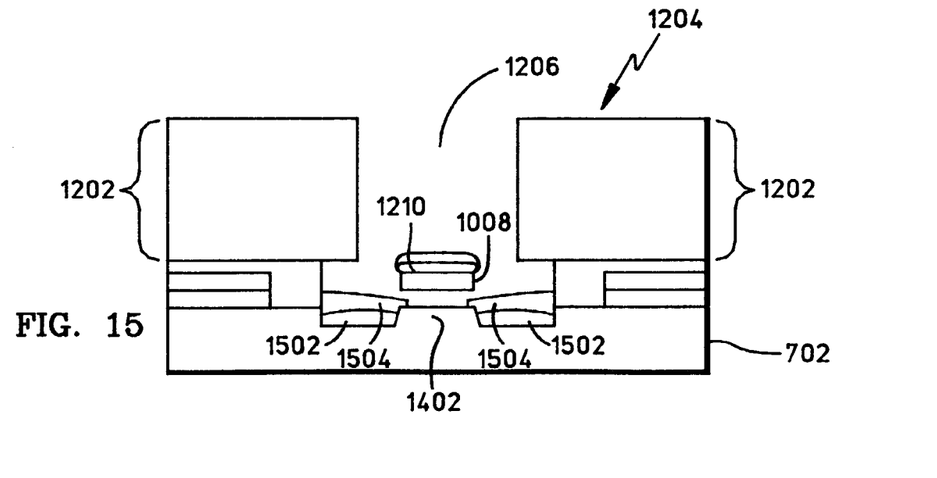
FIG. 15 is the ninth in the series of ten cross-sectional illustrations of FIGS. 7–16 in the method of making a read sensor described in relation to FIG. 6, which shows material layers (e.g. hard bias and lead layers) deposited with the barrier structure in place and formed around sides of the second mask.

In FIG. 15, it is shown that hard bias layers 1502 and lead layers 1504 are then deposited through opening 1206 of barrier structure 1204 so that they are formed around edges of read sensor 1402 (step 614 of FIG. 6). Hard bias layers 1502 may be made with any suitable hard magnetic material, such as cobalt-platinum-chromium or other suitable cobalt-based alloy, as examples. Hard bias layers 1502 may be deposited to a thickness of between about 50 and 500 Angstroms. Lead layers 1504 may be made with any suitable conductive material, such as gold, tungsten, rhodium, or tantalum, as examples. Lead layers 1504 may be deposited to a thickness of between 100 and 1000 Angstroms.

Figure 16:
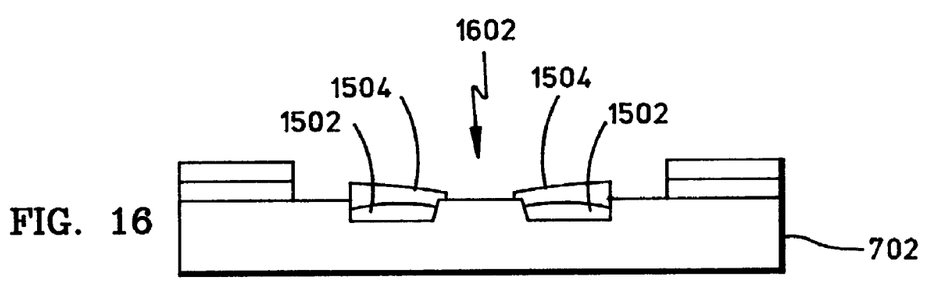
FIG. 16 is the last in the series often cross-sectional illustrations of FIGS. 7–16 in the method of making a read sensor described in relation to FIG. 6, which shows the second mask and the barrier structure removed to expose the read sensor.

Barrier structure 1204 may have the same or similar properties as barrier structure 206 described in relation to FIG. 2. Barrier structure 1204 of FIG. 15 (initially formed and shown in FIG. 12) surrounds central bridged mask 1210 and is used to physically block hard bias and lead materials being directed at relatively low deposition angles. With use of barrier structure 1204, hard bias and lead layer materials will be less likely to form underneath bridged mask 1210. During step 608 of FIG. 6, barrier structure 1204 is formed with appropriate dimensions so that materials deposited at angles at or below θ degrees are physically blocked by barrier structure 1204 (see angle θ in FIG. 2). For example, barrier structure 1204 may be formed with appropriate dimensions so that materials deposited at angles at or below seventy-eight (78) degrees are physically blocked by barrier structure 1204. However, the deposition angles to be blocked will vary (may be greater or lesser) and depend upon the particular application and desired results. For example, barrier structure 1204 may alternatively be formed to block materials deposited at angles at or below seventy-one (71) degrees. Exemplary dimensions of barrier structure 1204 to achieve such angles are D=1 μm and H=3 to 5 μm (see D and H in FIG. 2). Barrier structure 1204 and mask 1210 of FIG. 15 are subsequently removed by applying a conventional stripper solution, for example, resulting in the structure shown in FIG. 16.

Thus, methods of making a read sensor of a magnetic head with use of a surrounding barrier structure have been described. In one illustrative example, the method involves forming a barrier structure which surrounds a mask; and depositing, with use of the barrier structure, metal layers to form around a read sensor formed below the mask. The barrier structure may be formed by, as an example, the acts of depositing one or more barrier structure layers and performing a photolithography process. The method may include the additional act of etching, with use of the mask, a plurality of read sensor layers to form the read sensor below the mask. The deposited material layers may be, for example, metal layers such as hard bias and lead layers for the read sensor. The barrier structure physically blocks materials being deposited at relatively low angles so as to maintain better process control and to improve the formation and symmetry of deposited materials around the read sensor.

It is to be understood that the above is merely a description of preferred embodiments of the invention and that various changes, alterations, and variations may be made without departing from the true spirit and scope of the invention as set for in the appended claims. Few if any of the terms or phrases in the specification and claims have been defined with any special particular meaning that is different from their plain language meaning, and therefore the specification is not to be used to define terms in an unduly narrow sense.

What is claimed is:

1. A method for use in making a read sensor, comprising:
   forming a barrier structure which surrounds a bridged mask; and
   depositing, with the barrier structure in place, one or more metal layers around a read sensor formed below the bridged mask, where the barrier structure blocks the deposition of metal layers directed at deposition angles less than 71° as to reduce the formation of metal layers beneath the bridged mask and over the read sensor.

2. The method of claim 1 wherein the barrier structure blocks the deposition of metal layers so as to prevent electrical shorting of the metal layers over the read sensor.

3. The method of claim 1 wherein the barrier structure has a height that is at least four times a height of the bridged mask to block the deposition of the metal layers directed at deposition angles less than 71°.

4. The method of claim 1, wherein the one or more metal layers comprises at least one of hard bias and lead layers.

5. The method of claim 1, further comprising:
   prior to depositing the one or more metal layers, etching a plurality of read sensor layers to form the read sensor below the bridged mask.

6. The method of claim 1, wherein the act of forming the barrier structure includes the further act of:
   depositing one or more barrier structure layers over a plurality of read sensor layers.

7. The method of claim 1, further comprising: wherein the act of forming the barrier structure includes the further acts of:
   depositing one or more barrier structure layers over a plurality of read sensor layers;
   forming the barrier structure from the one or more barrier structure layers; and
   prior to depositing the one or more metal layers, etching a plurality of read sensor layers to form the read sensor below the bridged mask.

8. The method of claim 1, wherein the barrier structure comprises photoresist.

9. The method of claim 1, wherein the act of forming the barrier structure comprises forming it at a distance of at least one width of the bridged mask from side edges of the bridged mask.

10. A method for use in making a read sensor, comprising:
    depositing one or more barrier structure layers;
    forming a barrier structure from the one or more barrier structure layers which has a top opening to expose a top and side edges of a mask;
    etching a plurality of read sensor layers to form a read sensor below the mask;
    depositing, with use of the bridged mask and the barrier structure in place, one or more material layers around the read sensor;
    wherein the mask comprises a bridged mask; and
    wherein the barrier structure blocks the deposition of the one or more material layers directed at deposition angles less than 71°, to reduce formation of deposited material layers over the read sensor and beneath the mask.

11. The method of claim 10 wherein the barrier structure reduces the formation of material layers below the mask.

12. The method of claim 10 wherein the barrier structure increases symmetry of material layers formed around the read sensor, from center to edges of the read sensor.

13. The method of claim 10, wherein the act of depositing the one or more material layers comprises depositing one or more layers of metal.

14. The method of claim 10, wherein the act of depositing one or more material layers comprises depositing hard bias and lead layers.

15. The method of claim 10, wherein the act of forming the barrier structure comprises photolithography.

16. The method of claim 10, further comprising:
    prior to depositing and forming the barrier structure, forming the mask over the plurality of read sensor layers.

17. The method of claim 10, further comprising:
    after depositing and forming the barrier structure, etching to remove an underlayer of the mask to thereby form the bridged mask.

18. A method of making a read sensor or a semiconductor device, comprising:
    depositing one or more barrier structure layers over one or more first layers of materials;
    forming a barrier structure from the one or more barrier structure layers;
    wherein the barrier structure has a top opening which exposes a top and side edges of a mask formed over the one or more first layers of materials;
    etching the one or more first layers of materials to form, below the mask, a structure comprising one of the read sensor and the semiconductor device;
    depositing, with the barrier structure in place, one or more second layers of materials which form around the structure;
    wherein the mask comprises a bridged mask; and
    wherein the barrier structure has a height that is at least four times a height of the bridged mask so as to block the deposition of second layer materials directed at deposition angles less than 71°, which thereby reduces formation of the second layer materials underneath the bridged mask and over the structure.

19. The method of claim 18 wherein the one or more second layers of materials comprise metal, and the barrier structure blocks the deposition of metal so as to reduce the likelihood of electrical shorting of metal over the structure.

20. The method of claim 18 wherein the barrier structure increases symmetry of one or more second layers of materials deposited around the bridged mask.

21. The method of claim 18, wherein the structure comprises the read sensor.

22. The method of claim 18, further comprising:
    removing the bridged mask and the barrier structure.

23. A method for use in forming a read sensor of a magnetic head, comprising:
    forming a barrier structure which surrounds a bilayer mask formed over a plurality of read sensor layers;
    etching, with the barrier structure in place, so as to remove an underlayer of the bilayer mask to form a bridged mask over the read sensor layers;
    etching, with the barrier structure in place, the read sensor layers to form a read sensor below the bridged mask;
    depositing, with the barrier structure in place, one or more layers of metal which form around edges of the read sensor; and wherein the barrier structure blocks the deposition of metal directed at deposition angles less than 71°, so as to reduce metal formation underneath the bridged mask and over the read sensor.

24. The method of claim 23, wherein the act of forming the barrier structure comprises forming it with a height that is at least four times a height of the bilayer mask.

25. The method of claim 23, wherein the act of forming the barrier structure comprises forming it at a distance of at least one width of the bilayer mask from side edges of thereof.

26. The method of claim 23,
wherein the barrier structure blocks the deposition of metal so as to reduce the likelihood of electrical shorting of metal over the read sensor.

27. The method of claim 23, further comprising:
wherein the one or more layers of metal comprise lead layers of the read sensor.

28. The method of claim 23, further comprising:
wherein the barrier structure increases symmetry of metal formation around the read sensor, from center to edges of the read sensor.

29. A method for use in forming a read sensor of a magnetic head, comprising:
depositing a plurality of read sensor layers;
depositing one or more first mask layers over the read sensor layers;
depositing one or more second mask layers over the one or more first mask layers;
forming a first central mask from the one or more second mask layers;
forming a second central mask underneath the first central mask at least in part by etching the one or more first mask layers with the first central mask in place;
removing the first central mask;
depositing one or more third mask layers over and around the second central mask;
forming a barrier structure from the one or more third mask layers which surrounds the second central mask and has a top opening which exposes the top and side edges of the second central mask;
etching the read sensor layers to form a read sensor below the second central mask; and
depositing, with the second central mask and the barrier structure in place, hard bias and lead layers around the read sensor, wherein the barrier structure blocks the deposition of hard bias and lead material directed at deposition angles less than 71° to reduce the deposition of hard bias and lead material beneath the second central mask.

* * * * *